United States Patent [19]

Carter

[11] Patent Number: 5,715,185

[45] Date of Patent: Feb. 3, 1998

[54] ANIMAL FEED SYSTEM

[76] Inventor: Franklin Carter, 3001 Rockborough Ct., Ft. Collins, Colo. 80525

[21] Appl. No.: 632,796

[22] Filed: Apr. 17, 1996

[51] Int. Cl.$^6$ .................................................. G06F 17/00
[52] U.S. Cl. ..................... 364/578; 364/551.01; 426/644
[58] Field of Search .............................. 364/578, 571.03, 364/552, 551.01, 550, 420, 151, 149, 148; 119/70, 401, 437, 475, 487, 490; 426/480, 574, 644

[56] References Cited

U.S. PATENT DOCUMENTS

| | | | |
|---|---|---|---|
| 3,785,345 | 1/1974 | Rhinehart et al. | 119/18 |
| 4,745,472 | 5/1988 | Hayes | 348/141 |
| 4,849,232 | 7/1989 | Baker et al. | 426/644 |
| 4,864,507 | 9/1989 | Ebling et al. | 364/468 |
| 4,872,421 | 10/1989 | Laurent et al. | 119/1 |
| 5,091,195 | 2/1992 | Havens | 426/2 |
| 5,105,767 | 4/1992 | Gordon et al. | 119/57.92 |
| 5,247,460 | 9/1993 | LaBudde | 364/552 |
| 5,466,445 | 11/1995 | Hunter | 424/78.31 |
| 5,505,976 | 4/1996 | Bland et al. | 426/532 |
| 5,566,069 | 10/1996 | Clark, Jr. et al. | 364/420 |

OTHER PUBLICATIONS

Conrad et al., "The Developoment of a Linear Programming Package to Optimize Production in a Poultry Processing Plant", Computers in Agriculture 1994: Proceedings of the 5th Int'l Conf. 6–9 Feb. 1994, pp. 194–198.

*Primary Examiner*—Kevin J. Teska
*Assistant Examiner*—Tyrone V. Walker
*Attorney, Agent, or Firm*—Sheridan Ross, P.C.

[57] ABSTRACT

A method and system for assaying changes to a procedure or practice in processing chickens into saleable chicken meat is disclosed. In particular, the assay determines an impact of (a change in ) a chicken growing and processing related factor on an entire chicken growing and processing system, wherein the chicken growing and processing system includes at least some the following components: a chicken breeder farm, a chicken hatchery, a chicken growing facility, a chicken meat processing plant, and a chicken transportation capability. Such an analysis of the use of the factor provides for an assessment of the impact of the factor according to how it impacts a characteristic of saleable chicken meat output by the chicken growing and processing system. More particularly, the assay determines a change in gross profits of the chicken growing and processing system as a whole due to a change in the factor at one or more of the chicken growing and processing system components.

20 Claims, 23 Drawing Sheets

332 —

FOR THE PRESENT CHICKEN POPULATION, DETERMINE
STATISTICS RELATED TO THE NUMBER OF CHICKENS
PROCESSED AT THE PROCESSING PLANT 36 AS FOLLOWS:
(A) NBR_BIRDS_PROCESSED ←
    (NBR_CHICKENS) * (1 - (MORTALITY * (0.01)));
(B) SALEABLE_MEAT_BIRDS ←
    (NBR_BIRDS_PROCESSED) - (NBR_CONDEMNED).

336 —

FOR THE PRESENT CHICKEN POPULATION, DETERMINE
STATISTICS RELATED TO THE WEIGHTS OF THE CHICKENS,
AS MEASURED AT THE PROCESSING PLANT 36, AS
FOLLOWS:
(A) AVG_WT ← DETERMINE THE AVERAGE WEIGHT OF A
    CHICKEN AT THE PROCESSING PLANT 36;
(B) CARCASS_WT ← (AVG_WT)*
    (PCT_SALEABLE_MEAT)/100;
(C) BREAST_WT ← (CARCASS_WT) * (PCT_BREAST_WT)/100;
(D) PARTIAL_CARCASS_WT ←
    (CARCASS_WT) - (BREAST_WT).

340 —

FOR THE PRESENT CHICKEN POPULATION, DETERMINE THE
CHICKEN FEED COST STATISTICS AS FOLLOWS:
(A) FEED_COST_PER_TON ← DETERMINE AVERAGE FEED
    COST PER TON;
(B) FEED_COST_PER_LB ← FEED_COST_PER_TON/2000;
(C) FEED_CONVERSION ← DETERMINE THE AVERAGE
    NUMBER OF POUNDS OF CHICKEN FEED PROVIDED
    PER POUND OF CHICKEN PROCESSED; (TOTAL
    AMOUNT OF CHICKEN FEED FED) *
    [1/(NBR_BIRDS_PROCESSED * AVG_WT)];
(D) AMT_OF_FEED_PER_BIRD ← (AVG_WT) *
    (FEED_CONVERSION);
(E) FEED_COST_PER_BIRD ← (AMT_OF_FEED_PER_BIRD) *
    (FEED_COST_PER_LB);
(F) FEED_COST_PER_1000 ← (FEED_COST_PER_BIRD) * 1000.

FOR THE PRESENT CHICKEN POPULATION, DETERMINE STATISTICS RELATED TO THE AVERAGE VALUE OF THE CHICKENS AT THE PROCESSING PLANT 36 AS FOLLOWS:
(A) PARTIAL_CARCASS_VALUE ← (PARTIAL_CARCASS_WT)
    * (PARTIAL_CARCASS_PRICE_PER_LB);
(B) BREAST_VALUE ← (BREAST_WT) *
    (BREAST_PRICE_PER_LB);
(C) CHICKEN_VALUE ← (PARTIAL_CARCASS_VALUE) +
    (BREAST_VALUE);
(D) TOTAL_CHICKEN_VALUE ← (CHICKEN_VALUE) *
    [(NBR_BIRDS_PROCESSED) * NBR_CONDEMNED];
(E) CHICKEN_VALUE_PER_1000 ←
    (TOTAL_CHICKEN_VALUE) * (1000) *
    [1/(NBR_BIRDS_PROCESSED)].

348

FOR THE PRESENT CHICKEN POPULATION, DETERMINE STATISTICS RELATED TO THE VALUE OF THE CHICKENS CONDEMNED AT THE PROCESING PLANT 36 AS FOLLOWS:
(A) CONDEMNED_VALUE ← (PCT_CONDEMNED) * (.01) *
    (NBR_BIRDS_PROCESSED) * (CHICKEN_VALUE);
(B) CONDEMNED_VALUE_PER_1000 ←
    (CONDEMNED_VALUE) * (1000) *
    (NBR_BIRDS_PROCESSED).

352

FOR THE PRESENT CHICKEN POPULATION, DETERMINE COST (CREDIT) STATISTICS RELATED TO THE FACTOR BEING ASSAYED AS FOLLOWS:
(A) FACTOR_VALUE ← DETERMINE THE TOTAL COST
    (CREDIT) RELATED TO THE FACTOR BEING ASSAYED
    WHEREIN THIS COST (CREDIT) IS NOT INCLUDED IN
    THE STATISTICS DETERMINED IN THE STEPS ABOVE;
(B) FACTOR_VALUE_PER_1000 ← (FACTOR_VALUE) * (1000)
    (NBR_BIRDS_PROCESSED).

FOR THE PRESENT CHICKEN POPULATION, DETERMINE
STATISTICS RELATED TO THE PROFIT OF THE ENTIRE
CHICKEN PROCESSING SYSTEM OF FIG. 1 AS FOLLOWS:
(A) GROSS_PROFIT_PER_1000 ←
    (CHICKEN_VALUE_PER_1000) -
    (CONDEMNED_PER_1000);
(B) FACTOR_ADJUSTED_PROFIT ←
    (GROSS_PROFIT_PER_1000) +
    (FACTOR_VALUE_PER_1000).

360 —

STORE THE FOLLOWING STATISTICS:
NBR_CHICKENS, MORTALITY, AVG_WT, FEED_CONVERSION,
PCT_SALEABLE_MEAT, PCT_BREAST_YLD,
FEED_COST_PER_TON, PARTIAL_CARCASS_PRICE_PER_LB,
BREAST_PRICE_PER_LB, PCT_CONDEMNED,
NBR_BIRDS_PROCESSED, GROSS_PROFIT,
FEED_COST_PER_1000, FACTOR_VALUE_PER_1000,
GROSS_PROFIT_PER_1000, FEED_COST_PER_1000,
FACTOR_ADJUSTED_PROFIT.

END

CHICKEN PROCESSING STATISTICS

| DESCRIPTION | POPULATION A | POPULATION B | IDENTIFIER NAMES |
|---|---|---|---|
| MORTALITY | 3.78% | 3.10% | MORTALITY |
| AVG. WEIGHT (LBS) | 5.02 | 5.13 | AVG_WT |
| FEED CONVERSION | 1.93 | 1.94 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $163.00 | FEED_COST_PER_TON |
| PARTIAL CARCASS PRICE/LB | $0.50 | $0.50 | PARTIAL_CARCASS_PRICE_PER_LB |
| BREAST PRICE/LB | $0.00 | $0.00 | BREAST_PRICE_PER_LB |
| PERCENT CONDEMNED | 1.69% | 1.77% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 962.2 | 969 | NBR_BIRDS_PROCESSED |
| SELLING PRICE PER CHICKEN | 1.86 | 1.90 | CHICKEN_VALUE |
| RESULTING PRICE PER 1000 CHICKENS IN INITIAL POPULATION | $1,789.69 | $1,841.10 | CHICKEN_VALUE_PER_1000 |
| CONDEMNED CHICKEN VALUE PER 1000 | $30.25 | $32.59 | CONDEMNED_VALUE_PER_1000 |
| DIFFERENCE IN GROSS PROFITS PER 1000 | $1,759.44 | $1,808.51 | GROSS_PROFIT_PER_1000 |

| CHICKEN PROCESSING STATISTICS ||||
| DESCRIPTION | POPULATION A | POPULATION B | IDENTIFIER NAMES |
| --- | --- | --- | --- |
| FEED COST PER 1000 | $745.76 | $785.96 | FEED_COST_PER_1000 |
| EXTRA VALUE (COST) FOR ASSAYED CHICKEN PROCESSING FACTOR (PER 1000 CHICKENS) | -- | ($40.20) | FACTOR_VALUE_PER_1000 |
| GROSS PROFIT ADJUSTED FOR ASSAYED FACTOR (PER 1000 CHICKENS) | $1,759.44 | $1,768.31 | FACTOR_ADJUSTED_PROFIT |
| CHANGE IN GROSS PROFIT DUE TO ASSAYED FACTOR (PER 1000 CHICKENS) | -- | $49.07 | GROSS_PROFIT_CHANGE_FROM_FACTOR |
| NET PROFIT DUE TO ASSAYED FACTOR (PER 1000 CHICKENS) | -- | $8.87 | FACTOR_EFFECT |

CHICKEN PROCESSING STATISTICS

| DESCRIPTION | POPULATION A | POPULATION B | IDENTIFIER NAMES |
|---|---|---|---|
| MORTALITY | 4.08% | 4.57% | MORTALITY |
| AVG. WEIGHT (LBS) | 4.44 | 4.47 | AVG_WT |
| FEED CONVERSION | 1.99 | 1.98 | FEED_CONVERSION |
| PERCENT OF SALEABLE CHICKEN MEAT | 74.00% | 74.00% | PCT_SALEABLE_MEAT |
| PERCENT BREAST MEAT | $0.00 | $0.00 | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $1.50 | $1.50 | BREAST_PRICE_PER_LB |
| PERCENT CONDEMNED | 1.10% | 1.14% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 959.2 | 954.3 | NBR_BIRDS_PROCESSED |
| SELLING PRICE PER CHICKEN | $1.64 | $1.65 | CHICKEN_VALUE |
| RESULTING PRICE PER 1000 CHICKENS IN INITIAL POPULATION | $1,573.09 | $1,574.60 | CHICKEN_VALUE_PER_1000 |
| CONDEMNED CHICKEN VALUE PER 1000 | $17.30 | $17.95 | CONDEMNED_VALUE_PER_1000 |

| CHICKEN PROCESSING STATISTICS | | | |
|---|---|---|---|
| DESCRIPTION | POPULATION A | POPULATION B | IDENTIFIER NAMES |
| DIFFERENCE IN GROSS PROFITS PER 1000 | $1,555.79 | $1,556.65 | GROSS_PROFIT_PER_1000 |
| FEED COST PER 1000 | $678.01 | $675.69 | FEED_COST_PER_1000 |
| XTRA VALUE (COST) FOR ASSAYED CHICKEN PROCESSING FACTOR (PER 1000 CHICKENS) | --- | $2.32 | FACTOR_VALUE_PER_1000 |
| GROSS PROFIT ADJUSTED FOR ASSAYED FACTOR (PER 1000 CHICKENS) | $1,555.79 | $1,558.97 | FACTOR_ADJUSTED_PROFIT |
| CHANGE IN GROSS PROFIT DUE TO ASSAYED FACTOR (PER 1000 CHICKENS) | --- | $0.86 | GROSS_PROFIT_CHANGE_FROM_FACTOR |
| NET PROFIT DUE TO ASSAYED FACTOR (PER 1000 CHICKENS) | --- | $3.18 | FACTOR_EFFECT |

CHICKEN PROCESSING STATISTICS

| DESCRIPTION | POPULATION A | POPULATION B | IDENTIFIER NAMES |
|---|---|---|---|
| MORTALITY | 4.58% | 3.64% | MORTALITY |
| AVG. WEIGHT (LBS) | 4.44 | 4.47 | AVG_WT |
| FEED CONVERSION | 2.01 | 1.97 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $1.50 | $1.50 | BREAST_PRICE_PER_LB |
| PERCENT CONDEMNED | 1.10% | 1.07% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 954.2 | 963.6 | NBR_BIRDS_PROCESSED |
| SELLING PRICE PER CHICKEN | $1.64 | $1.65 | CHICKEN_VALUE |
| RESULTING PRICE PER 1000 CHICKENS IN INITIAL POPULATION | $1,564.89 | $1,589.94 | CHICKEN_VALUE_PER_1000 |
| CONDEMNED CHICKEN VALUE PER 1000 | $17.21 | $17.01 | CONDEMNED_VALUE_PER_1000 |

| CHICKEN PROCESSING STATISTICS | | | |
|---|---|---|---|
| DESCRIPTION | POPULATION A | POPULATION B | IDENTIFIER NAMES |
| DIFFERENCE IN GROSS PROFITS PER 1000 | $1,547.68 | $1,572.93 | GROSS_PROFIT_PER_1000 |
| FEED COST PER 1000 | $681.25 | $678.83 | FEED_COST_PER_1000 |
| XTRA VALUE (COST) FOR ASSAYED ...ICKEN PROCESSING FACTOR (PER 1000 CHICKENS) | --- | $2.42 | FACTOR_VALUE_PER_1000 |
| GROSS PROFIT ADJUSTED FOR ASSAYED FACTOR (PER 1000 CHICKENS) | $1,547.68 | $1,575.35 | FACTOR_ADJUSTED_PROFIT |
| CHANGE IN GROSS PROFIT DUE TO ASSAYED FACTOR (PER 1000 CHICKENS) | --- | $25.25 | GROSS_PROFIT_CHANGE_FROM_FACTOR |
| NET PROFIT DUE TO ASSAYED FACTOR (PER 1000 CHICKENS) | --- | $27.67 | FACTOR_EFFECT |

CHICKEN PROCESSING STATISTICS

| DESCRIPTION | POPULATION A | POPULATION B | IDENTIFIER NAMES |
|---|---|---|---|
| MORTALITY | 6.26% | 3.24% | MORTALITY |
| AVG. WEIGHT (LBS) | 4.38 | 4.44 | AVG_WT |
| FEED CONVERSION | 1.87 | 1.86 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $1.50 | $1.50 | BREAST_PRICE_PER_LB |
| PERCENT CONDEMNED | 0.85% | 0.85% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 937.4 | 967.6 | NBR_BIRDS_PROCESSED |
| SELLING PRICE PER CHICKEN | $1.62 | $1.64 | CHICKEN_VALUE |
| RESULTING PRICE PER 1000 CHICKENS IN INITIAL POPULATION | $1,518.59 | $1,586.86 | CHICKEN_VALUE_PER_1000 |
| CONDEMNED CHICKEN VALUE PER 1000 | $12.91 | $13.49 | CONDEMNED_VALUE_PER_1000 |

| CHICKEN PROCESSING STATISTICS | | | |
|---|---|---|---|
| DESCRIPTION | POPULATION A | POPULATION B | IDENTIFIER NAMES |
| DIFFERENCE IN GROSS PROFITS PER 1000 | $1,505.68 | $1,573.37 | GROSS_PROFIT_PER_1000 |
| FEED COST PER 1000 | $614.23 | $639.27 | FEED_COST_PER_1000 |
| XTRA VALUE (COST) FOR ASSAYED CHICKEN PROCESSING FACTOR (PER 1000 CHICKENS) | --- | ($25.04) | FACTOR_VALUE_PER_1000 |
| GROSS PROFIT ADJUSTED FOR ASSAYED FACTOR (PER 1000 CHICKENS) | $1,505.68 | $1,548.33 | FACTOR_ADJUSTED_PROFIT |
| CHANGE IN GROSS PROFIT DUE TO ASSAYED FACTOR (PER 1000 CHICKENS) | --- | $67.69 | GROSS_PROFIT_CHANGE_FROM_FACTOR |
| NET PROFIT DUE TO ASSAYED FACTOR (PER 1000 CHICKENS) | --- | 42.65 | FACTOR_EFFECT |

CHICKEN PROCESSING STATISTICS

| DESCRIPTION | POPULATION A | POPULATION B | IDENTIFIER NAMES |
|---|---|---|---|
| MORTALITY | 6.26% | 6.00% | MORTALITY |
| AVG. WEIGHT (LBS) | 4.38 | 4.43 | AVG_WT |
| FEED CONVERSION | 1.87 | 1.86 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $1.50 | $1.50 | BREAST_PRICE_PER_LB |
| PERCENT CONDEMNED | 0.85% | 0.85% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 937.4 | 940.0 | NBR_BIRDS_PROCESSED |
| SELLING PRICE PER CHICKEN | $1.62 | $1.64 | CHICKEN_VALUE |
| RESULTING PRICE PER 1000 CHICKENS IN INITIAL POPULATION | $1,518.59 | $1,541.60 | CHICKEN_VALUE_PER_1000 |
| CONDEMNED CHICKEN VALUE PER 1000 | $12.91 | $13.10 | CONDEMNED_VALUE_PER_1000 |

| CHICKEN PROCESSING STATISTICS | | | |
|---|---|---|---|
| DESCRIPTION | POPULATION A | POPULATION B | IDENTIFIER NAMES |
| DIFFERENCE IN GROSS PROFITS PER 1000 | $1,505.68 | $1,528.50 | GROSS_PROFIT_PER_1000 |
| FEED COST PER 1000 | $614.23 | $620.18 | FEED_COST_PER_1000 |
| XTRA VALUE (COST) FOR ASSAYED CHICKEN PROCESSING FACTOR (PER 1000 CHICKENS) | --- | ($5.95) | FACTOR_VALUE_PER_1000 |
| GROSS PROFIT ADJUSTED FOR ASSAYED FACTOR (PER 1000 CHICKENS) | $1,505.68 | $1,522.55 | FACTOR_ADJUSTED_PROFIT |
| CHANGE IN GROSS PROFIT DUE TO ASSAYED FACTOR (PER 1000 CHICKENS) | --- | $22.82 | GROSS_PROFIT_CHANGE_FROM_FACTOR |
| NET PROFIT DUE TO ASSAYED FACTOR (PER 1000 CHICKENS) | --- | $16.87 | FACTOR_EFFECT |

CHICKEN PROCESSING STATISTICS

| DESCRIPTION | POPULATION A | POPULATION B | IDENTIFIER NAMES |
|---|---|---|---|
| MORTALITY | 6.26% | 5.98% | MORTALITY |
| AVG. WEIGHT (LBS) | 4.38 | 4.41 | AVG_WT |
| FEED CONVERSION | 1.87 | 1.88 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $0.00 | $1.50 | BREAST_PRICE_PER_LB |
| PERCENT CONDEMNED | 0.85% | 0.85% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 937.4 | 940.2 | NBR_BIRDS_PROCESSED |
| SELLING PRICE PER CHICKEN | $1.62 | $1.63 | CHICKEN_VALUE |
| RESULTING PRICE PER 1000 CHICKENS IN INITIAL POPULATION | $1,518.59 | $1,532.53 | CHICKEN_VALUE_PER_1000 |
| CONDEMNED CHICKEN VALUE PER 1000 | $12.91 | $13.03 | CONDEMNED_VALUE_PER_1000 |
| GROSS PROFITS PER 1000 | $1,505.68 | $1,519.50 | GROSS_PROFIT_PER_1000 |

FIG. 10B

| CHICKEN PROCESSING STATISTICS | | | |
|---|---|---|---|
| DESCRIPTION | POPULATION A | POPULATION B | IDENTIFIER NAMES |
| FEED COST PER 1000 | $614.23 | $617.54 | FEED_COST_PER_1000 |
| EXTRA VALUE (COST) FOR ASSAYED CHICKEN PROCESSING FACTOR (PER 1000 CHICKENS) | --- | ($3.31) | FACTOR_VALUE_PER_1000 |
| GROSS PROFIT ADJUSTED FOR ASSAYED FACTOR (PER 1000 CHICKENS) | $1,505.68 | $1,516.19 | FACTOR_ADJUSTED_PROFIT |
| CHANGE IN GROSS PROFIT DUE TO ASSAYED FACTOR (PER 1000 CHICKENS) | --- | $13.82 | GROSS_PROFIT_CHANGE_FROM_FACTOR |
| NET PROFIT DUE TO ASSAYED FACTOR (PER 1000 CHICKENS) | --- | $10.51 | FACTOR_EFFECT |

FIG. 11A

CHICKEN PROCESSING STATISTICS

| DESCRIPTION | POPULATION A | POPULATION B | IDENTIFIER NAMES |
|---|---|---|---|
| MORTALITY | 6.26% | 4.75% | MORTALITY |
| AVG. WEIGHT (LBS) | 4.38 | 4.41 | AVG_WT |
| FEED CONVERSION | 1.87 | 1.87 | FEED_CONVERSION |
| PERCENT OF SALEABLE CHICKEN MEAT | 74.00% | 74.00% | PCT_SALEABLE_MEAT |
| PERCENT BREAST MEAT | 0.00% | 0.00% | PCT_BREAST_YLD |
| FEED COST/TON | $160.00 | $160.00 | FEED_COST_PER_TON |
| PARTIAL CARCASS PRICE/LB | $0.50 | $0.50 | PARTIAL_CARCASS_PRICE_PER_LB |
| BREAST PRICE/LB | $0.00 | $1.50 | BREAST_PRICE_PER_LB |
| PERCENT CONDEMNED | 0.85% | 0.85% | PCT_CONDEMNED |
| NUMBER CHICKENS (EGGS) IN INITIAL POPULATION | 1000 | 1000 | NBR_CHICKENS |
| NUMBER CHICKENS TO PROCESSING PLANT PER 1000 | 937.4 | 952.5 | NBR_BIRDS_PROCESSED |
| SELLING PRICE PER CHICKEN | $1.62 | $1.63 | CHICKEN_VALUE |
| RESULTING PRICE PER 1000 CHICKENS IN INITIAL POPULATION | $1,518.59 | $1,552.58 | CHICKEN_VALUE_PER_1000 |
| CONDEMNED CHICKEN VALUE PER 1000 | $12.91 | $13.20 | CONDEMNED_VALUE_PER_1000 |
| DIFFERENCE IN GROSS PROFITS PER 1000 | $1,505.68 | $1,539.38 | GROSS_PROFIT_PER_1000 |

CHICKEN PROCESSING STATISTICS

| DESCRIPTION | POPULATION A | POPULATION B | IDENTIFIER NAMES |
|---|---|---|---|
| FEED COST PER 1000 | $614.23 | $628.98 | FEED_COST_PER_1000 |
| EXTRA VALUE (COST) FOR ASSAYED CHICKEN PROCESSING FACTOR (PER 1000 CHICKENS) | --- | ($14.75) | FACTOR_VALUE_PER_1000 |
| LOSS PROFIT ADJUSTED FOR ASSAYED FACTOR (PER 1000 CHICKENS) | $1,505.68 | $1,524.63 | FACTOR_ADJUSTED_PROFIT |
| CHANGE IN GROSS PROFIT DUE TO ASSAYED FACTOR (PER 1000 CHICKENS) | --- | $33.70 | GROSS_PROFIT_CHANGE_FROM_FACTOR |
| NET PROFIT DUE TO ASSAYED FACTOR (PER 1000 CHICKENS) | --- | $18.95 | FACTOR_EFFECT |

CHICKEN PROCESSING STATISTICS

| DESCRIPTION | POPULATION A | POPULATION B | IDENTIFIER NAMES |
|---|---|---|---|
| MORTALITY | 10.82% | 8.51% | MORTALITY |
| AVG. WEIGHT (LBS) | 5.61 | 5.71 | AVG_WT |
| FEED CONVERSION | 1.99 | 1.99 | FEED_CONVERSION |
| PERCENT OF SALEABLE CHICKEN MEAT | 74.00% | 74.00% | PCT_SALEABLE_MEAT |
| PERCENT BREAST MEAT | 20.68% | 20.98% | PCT_BREAST_YLD |
| FEED COST/TON | $200.00 | $202.00 | FEED_COST_PER_TON |
| PARTIAL CARCASS PRICE/LB | $0.50 | $0.50 | PARTIAL_CARCASS_PRICE_PER_LB |
| BREAST PRICE/LB | $1.50 | $1.50 | BREAST_PRICE_PER_LB |
| PERCENT CONDEMNED | 0.00% | 0.00% | PCT_CONDEMNED |
| NUMBER CHICKENS (EGGS) IN POPULATION | 1000 | 1000 | NBR_CHICKENS |
| NUMBER CHICKENS TO PROCESSING PLANT PER 1000 | 891.8 | 914.9 | NBR_BIRDS_PROCESSED |
| SELLING PRICE PER CHICKEN | $2.93 | $3.00 | CHICKEN_VALUE |
| RESULTING PRICE PER 1000 CHICKENS IN INITIAL POPULATION | $2,612.97 | $2,744.70 | CHICKEN_VALUE_PER_1000 |
| CONDEMNED CHICKEN VALUE PER 1000 | $0.00 | $0.00 | CONDEMNED_VALUE_PER_1000 |

CHICKEN PROCESSING STATISTICS

| DESCRIPTION | POPULATION A | POPULATION B | IDENTIFIER NAMES |
|---|---|---|---|
| DIFFERENCE IN GROSS PROFITS PER 1000 | $2,612.97 | $2,744.70 | GROSS_PROFIT_PER_1000 |
| FEED COST PER 1000 | $995.60 | $1,049.99 | FEED_COST_PER_1000 |
| XTRA VALUE (COST) FOR ASSAYED iICKEN PROCESSING FACTOR (PER 1000 CHICKENS) | --- | ($54.39) | FACTOR_VALUE_PER_1000 |
| GROSS PROFIT ADJUSTED FOR ASSAYED FACTOR (PER 1000 CHICKENS) | $2,612.97 | $2,690.31 | FACTOR_ADJUSTED_PROFIT |
| CHANGE IN GROSS PROFIT DUE TO ASSAYED FACTOR (PER 1000 CHICKENS) | --- | $131.73 | GROSS_PROFIT_CHANGE_FROM_FACTOR |
| NET PROFIT DUE TO ASSAYED FACTOR (PER 1000 CHICKENS) | --- | $77.34 | FACTOR_EFFECT |

FIG. 12B

ANIMAL FEED SYSTEM

FIELD OF THE INVENTION

The present invention is directed to an assay and method for determining the efficacy of various factors on a chicken growing and processing system having more than one of the following chicken growing and processing components: a breeder farm, a hatchery, a grow-out facility, a chicken transportation capability, and a chicken meat processing plant.

BACKGROUND OF THE INVENTION

The industry for producing chicken meat is segmented into a number of distinct types of business units or organizational components with the components of each type concerned with a narrow aspect of chicken meat production. For example, FIG. 1 shows a chicken growing and processing system commencing with the breeding of chickens and ending with the packaging of chicken meat, wherein the double lined arrows indicate the flow of chickens through the chicken growing and processing system and the single arrows indicate the flow of chicken feed. That is, FIG. 1 includes the following distinct types of chicken growing and processing components:

(1.1) One or more chicken breeder farms 20 for the breeding of broiler chickens;

(1.2) One or more chicken hatcheries 24 that receive fertilized eggs from the breeder farms 20 and hatch chicks from the eggs;

(1.3) One or more broiler grow-out facilities 28 for receiving chicks from the hatcheries 24 and growing the chicks into chickens having an appropriate weight for processing into saleable chicken meat;

(1.4) A feed mill 32 for supplying chicken feed to the breeder farms 20, the hatcheries 24 and the broiler grow-out facilities 28;

(1.5) A processing plant 36 for receiving chickens from the grow-out facilities 28 and providing chicken meat for distribution; and (1.6) A chicken catching and hauling component 40 for catching and transporting chickens from the grow-out facilities 28 to the processing plant 36.

Each of the above-discussed chicken growing and processing components 20–40 are typically operated as individual profit centers. Accordingly, each such component is primarily concerned with increasing its own cost-effectiveness. In addressing such concerns, each manager operating one of the chicken growing and processing components typically strives to lower the component's individual operating costs and still provide an "adequate" product to client chicken growing and processing components. For example, the feed mill 32 may modify the composition of chicken feed to lower its costs to the grow-out facilities 28. Or, a breeder farm 20 may reduce certain chicken feed nutrients that does not decrease the number of fertilized eggs provided to a hatchery 24, but the mortality rate of the hatched chicks may increase, or, for example, a broiler grow-out facility 28 may reduce feed additives fed to its chickens just enough so that the chickens remain minimally healthy at the grow-out facility 28, but many may die while being transported to the processing plant 36.

Accordingly, the chicken growing and processing industry as a whole currently has a reduced efficiency and profits due to such shortsighted practices as described above. Further, such shortsightedness is reinforced due substantially to the lack of a chicken growing and processing analysis model and method that allows for a determination of the economic impact various factors have in affecting the quantity and/or quality of saleable chicken meat from a chicken growing and processing system as a whole.

Thus, it would be advantageous to the chicken growing and processing industry to have a method and system for modeling the chicken growing and processing system of FIG. 1 so that variations in such a system may be detected and/or evaluated to determine their economic impact.

SUMMARY OF THE INVENTION

The present invention is a model and system for assaying changes to a procedure or practice used in growing and processing chickens into saleable chicken meat, wherein the term "chicken growing and processing" or simply "chicken processing" herein is used to mean the procedure or practice of breeding, hatching, raising, transporting and rendering chickens into saleable chicken meat. That is, the present invention provides a method and system for assaying the impact of various changes to factors affecting one or more of the following components of a chicken growing and processing system: a chicken breeding component, a chicken hatching component, a chicken growing component, a chicken transporting component and/or a component for rendering chickens into saleable chicken meat products, wherein the assay determines the effect of the factor on the entire chicken growing and processing system. Said another way, the present invention provides an analysis of such factor changes according to how they impact a characteristic of saleable chicken meat which is output by a chicken growing and processing system as in FIG. 1.

Moreover, it is an object of the present invention that chicken growing and processing system assays provided by the present invention may be applied to a wide variety of chicken growing and processing influencing factors. For example, such factors may include a substance consumable by chickens (e.g., chicken feed, feed additives and drugs), a chicken growing and processing environmental characteristic (e.g., a temperature, a humidity, a number of hours of light, an audible stimulus (or lack thereof) and a size of chicken enclosure), and a genetic characteristic of chickens (e.g., a breed of chickens that yield a greater percentage of breast meat).

In order to provide an assay of the impact of a chicken growing and processing system influencing factor, the present invention provides a novel model of the chicken growing and processing system disclosed in FIG. 1, wherein the model provides reliable predictions as to the effect of the factor upon a characteristic of saleable chicken meat, and in particular, upon a characteristic for indicating the cost effectiveness of the chicken growing and processing system as a whole. This model yields a plurality of statistical measurements: (a) for measuring an impact of a chicken growing and processing factor change and (b) for measuring characteristics of saleable chicken meat. In particular, the model determines statistical measurements relating to: (a) the price of saleable chicken meat, (b) the number and value of chickens processed at the processing plant 36, (c) the number and value of chickens not processed into saleable chicken meat, (d) the weight of the chickens at the processing plant 36, (e) the cost of feeding the chickens, (f) any additional changes in chicken growing and processing overhead attributable to the factor change is not taken into account in the above statistics, and (g) the profit resulting from the chicken growing and processing system.

Accordingly, it is an aspect of the present invention to compare the results from at least two applications of the above-described model, each application using information obtained from processing a different population of chickens, wherein substantially the only pertinent change in the processing between these two populations of chickens is the change in the factor being assayed. More particularly, the present invention determines a change in the cost effectiveness of the chicken growing and processing system due the change in the factor being assayed.

Thus, the present invention provides a novel method and system for accurately assaying the effect of a chicken growing and processing influencing factor. Further, this results in the present invention being an effective predictor as to the cost effectiveness of continuing, expanding and/or propagating chicken growing and processing factor changes that heretofore would not have been contemplated due to the lack of an effective model for predicting a likely outcome resulting from such a change. Additionally, the prediction capabilities of the present invention can yield unanticipated benefits to those skilled in the art of chicken growing and processing in that the present invention quantifies the effects of chicken growing and processing influencing factors for the chicken growing and processing system of FIG. 1 as a whole where there has been no previous capability of performing such an analysis.

Other features and benefits of the present invention will become apparent from the detailed description with the accompanying figures contained hereinafter.

BRIEF DESCRIPTION OF THE DRAWINGS

FIGS. 3A–3D provide a description of the steps performed in modeling the chicken growing and processing system of FIG. 1 to determine statistics related to the chicken growing and processing system of FIG. 1 as a whole. In particular, this flowchart provides statistics related to one or more characteristics of saleable chicken meat;

FIGS. 5A and 5B illustrate a report output from the flowchart of FIG. 4 for comparing two populations of chickens processed by the chicken growing and processing system of FIG. 1, wherein the statistics of the column headed "POPULATION A" were obtained from a chicken population not provided with the feed additive, natamycin, and where the statistics of the column identified by "POPULATION B" is for a population of chickens provided with this feed additive;

FIGS. 6A and 6B illustrate an output from FIG. 4 comparing the statistics derived from two different populations of chickens processed by the chicken growing and processing system of FIG. 1, wherein the statistics from the column identified by "POPULATION A" were obtained from a chicken population not subject to the substance, aflatoxin, and wherein the statistics from the column identified as "POPULATION B" were obtained from a different chicken population that was subjected to this substance;

FIGS. 7A and 7B illustrate a report output from FIG. 4 for two populations of chickens processed by the chicken growing and processing system of FIG. 1 wherein the cost effectiveness of two different kinds of chicken feeding mechanisms are compared;

FIGS. 8A and 8B illustrate an output report from FIG. 4 providing statistics comparing the processing of a control chicken population to a chicken population that was fed a chicken medication conformed into "plates" produced by a first manufacturer;

FIGS. 9A and 9B illustrate an output report from FIG. 4 providing statistics for comparing the processing of a control population of chickens with a chicken population fed a "plate" conformed chicken medication from a second manufacturer different from the first manufacturer analyzed in FIGS. 8;

FIGS. 10A and 10B illustrate an output report from FIG. 4 for comparing the statistics of a control population of chickens fed a conventional chicken feed and a second population of chickens fed a chicken feed having a chicken medication manufactured in the form of "needles";

FIGS. 11A and 11B illustrate an output report from FIG. 4 for two populations of chickens processed by a chicken growing and processing system, wherein one population of chickens is a control population fed conventional chicken feed and a second population of chickens was fed chicken feed having a chicken medication in the form of "plates," wherein the "plate" medicated chicken feed here has the same composition as the "needle" medicated chicken feed composition analyzed in FIGS. 10; and FIGS. 12A and 12B illustrate an output report from FIG. 4 for two populations of chickens processed by a chicken growing and processing system, wherein one population of chickens is a control population fed conventional chicken feed and a second population of chickens was fed a chicken feed mixed with a special granular mineral compound.

DETAILED DESCRIPTION

Figure 1:
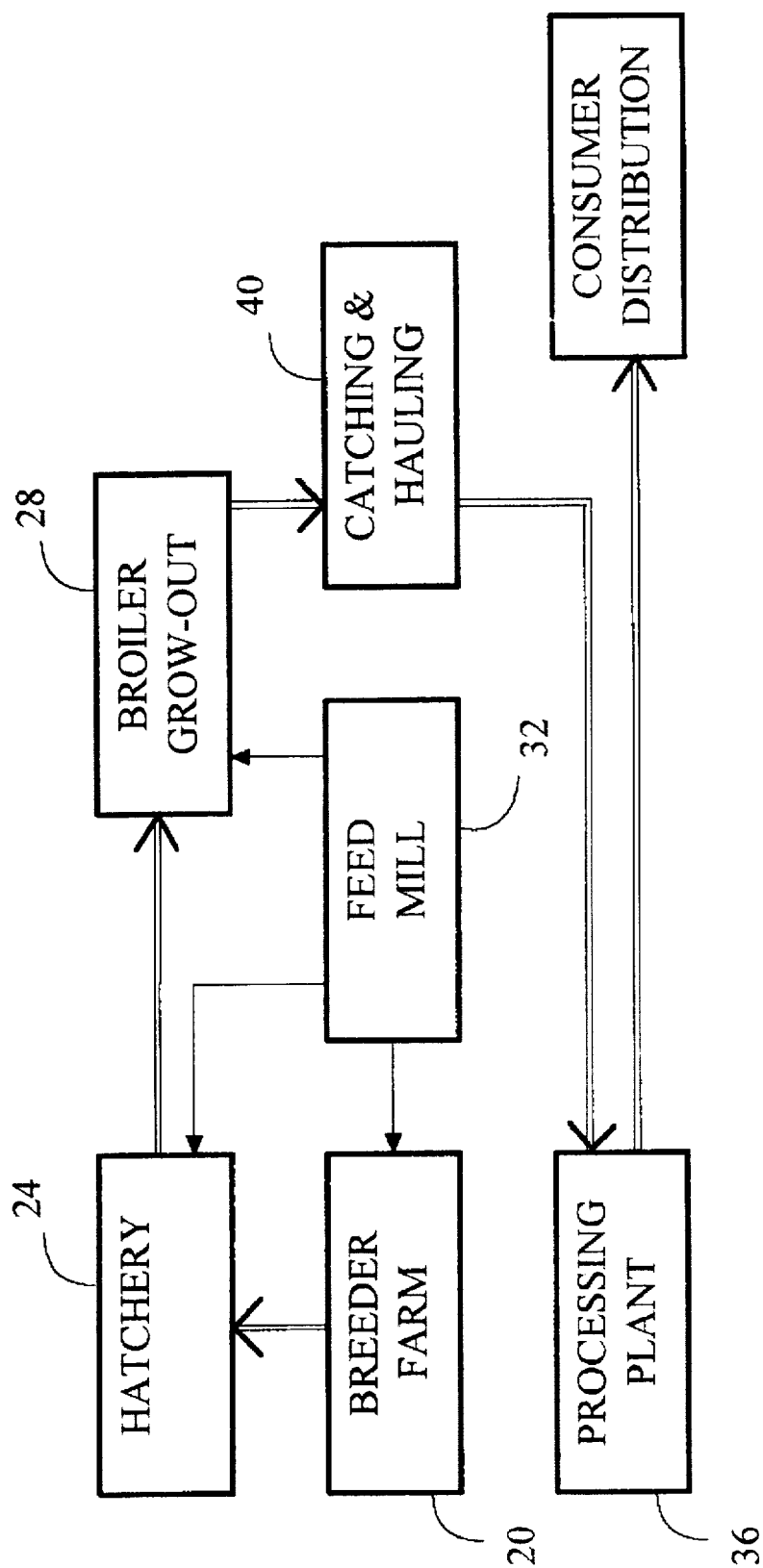
FIG. 1 is a block diagram of the business units or components involved in breeding, hatching, raising, transporting and rendering chickens to obtain saleable chicken meat.
Figure 2:
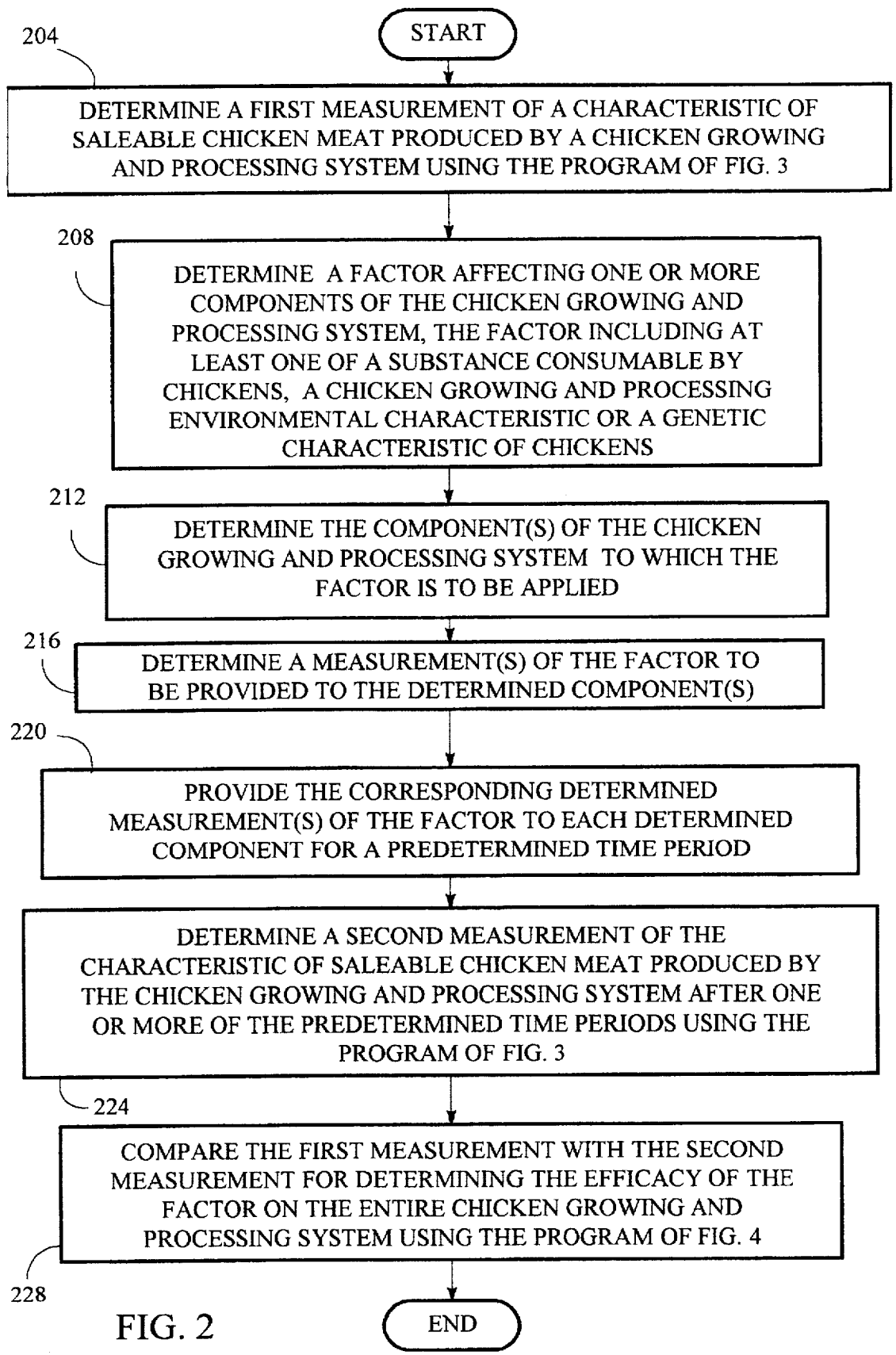
FIG. 2 is a high-level flowchart of the steps performed in the present invention for assaying the effect of a factor related to the components 20–36 of the chicken growing and processing system of FIG. 1.
Figure 3A:
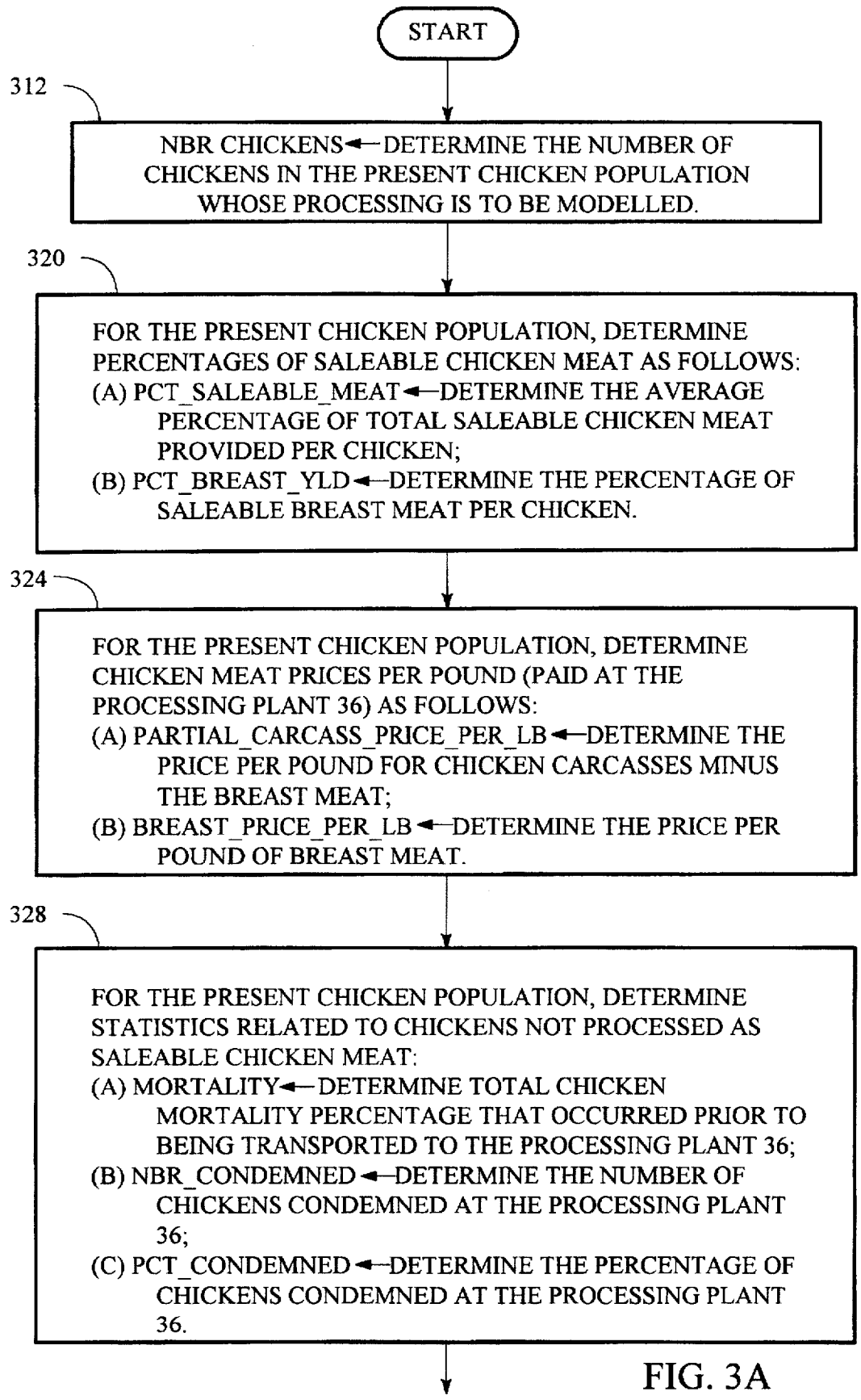

FIG. 2 presents a high level flowchart of the steps of the present invention for assaying the impact of a factor effecting a chicken growing and processing system such as in FIG. 1 discussed above. Accordingly, in step 204, a measurement is determined of a first characteristic of saleable chicken meat produced by a chicken growing and processing system as in FIG. 1. It is important to note that the measurement of a characteristic of saleable chicken meat referred to in this step may be any one of a plurality of measurements and/or characteristics. For example, this (first) measurement may be one of: price per pound of chicken breast meat, a total dollar amount for saleable chicken meat processed from a given population of chickens, a quality of saleable chicken meat, a quantity of saleable chicken meat, a measurement of the tenderness or uniformity of size of chicken breast meat, the percentage of fat in saleable chicken meat, and the amount of drugs or toxins within saleable chicken meat. Further note regarding this step, that the determination of this first measurement of a characteristic of saleable chicken meat is provided using a novel model of the chicken growing and processing system of FIG. 1, this model being embodied in the flowchart of FIGS. 3A–3D.

Subsequently, in step 208, the assay method and system of the present invention allows a user to determine a factor affecting the chicken growing and processing system of FIG. 1. In particular, the present invention is useful when the factor to be assayed is used by more than one of the chicken growing and processing components 20–36. Further note that a wide range of factors may be determined in the present step. For example, it is within the scope of the present invention that the determined factor may include at least one of the following: a substance consumable by chickens, a chicken growing and processing environmental characteristic, or a genetic characteristic of chickens. Additionally, it is within the scope of the present invention that the determined factor may be a composite of other factors such as a factor that is a combination of certain chicken feed additives such as feed additives and nutrients, or, humidity and nutrients.

In step 212, a determination is made regarding the components 20–36 of the chicken growing and processing system to which the factor determined in step 208 is to be applied. Thus, for example, if the factor to be applied includes one or more additives to the chicken feed, then one preferred embodiment of the present assay is to provide the chicken feed with the determined factor to chickens at the breeder farm 20, hatchery 24, and the broiler grow-out 28. Thus, if the factor is beneficial to the chicken growing and processing system, then in most cases, the longer the factor is applied to a chicken population, the more cost effective the factor will appear as chickens are processed that have been raised on the factor for a progressively longer period of time. Note that since the processing time of a generation of chickens within the chicken growing and processing system of FIG. 1 is approximately 40 to 50 days, this range of time typically provides a lower bound on the length of time to which the factor is to be applied to the chicken growing and processing system of FIG. 1.

In step 216, a determination is made regarding the amount or measurement of the factor determined in step 212 that is to be applied to one or more of the chicken growing and processing components to which the factor is to be applied. Note that it is within the scope of the present invention to apply different amounts of the determined factor to different components 20–36 within the chicken growing and processing system of FIG. 1. For example, an feed additive added to the chicken feed may be provided in different concentrations for the breeder farm 20, the hatchery 24 and the broiler grow-out 28. Further note that step 216 may be unnecessary in some chicken growing and processing system assays. For example, if the assay compares two different breeds of chickens using the steps of FIG. 2, then step 216 may be trivial. That is, the factor (i.e., the genetics of the two different populations being separately assayed) is presumably either entirely of one breed of chicken or entirely of a different breed of chicken. It is also worthwhile to note that factors of a quite different nature may be assayed with the present invention whereby step 216 may be unnecessary. For example, if the assay of the present invention is used to determine the net effect on the chicken growing and processing system of FIG. 1 when different types of mechanical chicken feeders are tested, then it is likely that the comparisons will be between the use of entirely one type of chicken feeder in a first measurement of a characteristic of saleable chicken meat, and a different kind of chicken feeder in another measurement of the characteristic of saleable chicken meat.

In step 220, the determined factor is provided to the components of the chicken growing and processing system to which the factor is to be applied for a predetermined period of time. In one embodiment of the present invention, the factor may be applied to each determined component of the chicken growing and processing system simultaneously.

In this case, the effect of the factor may be measured according to the length of time different aged chickens are exposed to the measurement(s) of the factor as provided in step 220. For example, if the factor is a chicken feed composition change or a medication added to the chicken's water, wherein the factor is applied to the hatchery 34 and broiler grow-out 28 simultaneously, then the chickens in the hatchery 34 preferably ingest the factor adjusted feed or water substantially their entire lives, whereas those chickens in the boiler grow-out 28 nearing an age for processing at the processing plant 36 ingest the factor adjusted chicken feed or water for only a short time. However, other strategies for providing the determined factor to the components of the chicken growing and processing system of FIG. 1 are also within the scope of the present invention. In particular, the factor may be applied only to a predetermined chicken population. Thus, as this population moves from one component to another the factor is applied at different times to the components. Additionally, note that as discussed above, the predetermined period of time will typically have a lower bound of 40 to 50 days.

Further, in another alternative method for assaying the factor, it has been determined that reliable measurements of the impact of the factor may be obtained by establishing the predetermined period of time at approximately 21 weeks. That is, assuming the factor is provided to all chickens (regardless of their ages) concurrently, during the first seven weeks, chickens are processed that have been provided with the factor a progressively longer amount of time until at the end of the seven weeks, the chickens processed (i.e., rendered into saleable chicken meat) at the processing plant 36 will have been provided with the factor their entire lives. Subsequently, for a second seven weeks, all chickens processed at the processing plant 36 will have been provided with the factor their entire lives. Thus, this second seven weeks becomes a steady state scenario for providing the factor. Finally, in the third set of seven weeks, the factor may be withheld from all chickens simultaneously. Accordingly, the chickens processed during this last seven weeks will have been provided with the factor a progressively lesser amount of time until at the end of this time period, the chickens processed at the processing plant 36 will not have been provided with the factor.

In yet another alternative method of assaying a chicken growing and processing affecting factor if there is a plurality of each of: the hatchery 24 and the broiler grow-out 28, then a control population of chickens and a factor provided population of chickens may be grown in parallel in duplicate but identical (modulo any factor induced changes) hatcheries and broiler grow-out components. Thus, for example, a first hatchery 24 and broiler grow-out 28 would provide the factor to their chickens while concurrently a second hatchery 24 and broiler grow-out 28 would not provide their chickens (the control population(s)) with the factor.

In step 224 of FIG. 2, a second measurement of the characteristic of saleable chicken meat produced by the chicken growing and processing system is determined using the same model of the chicken growing and processing system as was used in step 204 (the model being embodied in the flowchart of FIG. 3A–3D).

Finally, in step 228, a comparison is made between the first measurement and the second measurement of the characteristic of saleable chicken meat to determine the efficacy of the factor on the entire chicken growing and processing system.

Note, however, that other embodiments and/or sequencing of the assay steps of FIG. 2 are also within the scope of the present invention. In particular, steps 204 and 224 may be performed substantially concurrently after a control chicken population and a factor treated chicken population are grown in parallel as discussed herein above.

Referring now to FIGS. 3A–3D, a flowchart is presented of the steps performed in modeling the entire chicken growing and processing system of FIG. 1 to determine the impact of the factor determined in step 208 of FIG. 2. Accordingly, FIGS. 3A–3D is invoked a first time for modeling the chicken growing and processing system before applying the factor to be assayed, and again after the determined factor has been applied for a predetermined amount of time. Further, in one preferred embodiment of the present assay method and system, the first and second invocations of the model embodied by FIGS. 3A–3D are performed on two different chicken populations. Thus, if the determined factor of FIG. 2 (step 208) is substantially the only change in the chicken growing and processing system between the two populations of chickens, then the impact of the factor is provided by the statistics which result form the performance of the chicken growing and processing model of the present invention embodied in the flowchart of FIGS. 3A–3D.

Assuming now that the flowchart of FIGS. 3A–3D is invoked with the measurements related to one of the populations of chickens as discussed above, in step 312, the variable, NBR_CHICKENS, is assigned the value indicating the number of chickens in the population to which the present invocation of the model is to be applied. Subsequently, in step 320, a determination is made of the percentages of saleable chicken meat that was obtained from this population of chickens. In particular, a determination is made as to the average percentage of total saleable chicken meat provided per chicken (in the variable, PCT_SALEABLE_MEAT), and a determination as to the average percentage of saleable breast meat per chicken (in the variable, PCT_BREAST_YLD). Following this step, in step 324, a determination is made as to the prices per pound of the chicken meat obtained from the present population of chickens. This is, a determination is made as to the average price received per pound for chicken carcasses minus the breast meat (in the variable, PARTIAL_CARCASS_PRICE_PER_LB), and a determination of the price received per pound of chicken breast meat (in the variable, BREAST_PRICE_PER_LB). Note that it is important to have distinct measurements for the price of chicken breast meat and the remainder of the chicken carcass, in that the prices for these two portions of chicken meat have substantially diverged due to the growth in popularity of chicken breast meat at fast food outlets. That is, the average price received for chicken breast meat may be in the range of $0.75 to $1.50 per pound more than the average price per pound of non-breast chicken meat.

Subsequently, in step 328, statistics are determined related to the number of chickens not processed (i.e., not rendered) as saleable chicken meat. In particular, three such measurements are determined. That is, a percentage of the original chicken population that died at either the hatchery 24 or the broiler grow-out 28 (in the variable, MORTALITY), the number of chickens condemned at the processing plant 36 (in the variable, NBR_CONDEMNED), and the percentage of the chicken population that was condemned at the processing plant 36 (in the variable, PCT_CONDEMNED). Following this step, in step 332, statistics are determined related to the number of chickens processed at the processing plant 36. More particularly, the total number of chickens processed at the processing plant 36 is determined (in the variable, NBR_BIRDS_PROCESSED), and the number of chickens processed that produced saleable chicken meat rather than being condemned (in the variable, SALEABLE_MEAT_BIRDS).

Subsequently, in step 336, further statistics are determined related to the weights of the chickens as measured at the processing plant 36. In particular, five statistics are provided. That is, the average weight of a chicken in the present population when measured at the processing plant 36 (in the variable, AVG_WT), the average weight of saleable chicken meat per chicken (in the variable, CARCASS_WT), the average breast weight per chicken (in the variable, BREAST_WT), and the average weight of a chicken carcass after the breast meat is remove (in the variable, PARTIAL_CARCASS_WT).

Subsequently, in step 340, statistics are determined related to the cost of chicken feed. In particular, six statistics are calculated by the model of the present invention. These six statistics are as follows: the average cost of chicken feed per ton (in the variable, FEED_COST_PER_TON), the feed cost per pound (in the variable, FEED_COST_PER_LB), the average number of pounds of chicken feed required to produce each pound of chicken meat processed by the processing plant 36 as either saleable chicken meat or condemned meat (in the variable, FEED_CONVERSION), the average amount of chicken feed required by each chicken in the present population (in the variable, AMT_OF_FEED_PER_BIRD), the average feed cost per chicken in the present population (in the variable, FEED_COST_PER_BIRD) and the average feed cost per thousand chickens in the present chicken population being modeled (in the variable, FEED_COST_PER_THOUSAND). Note that it is particularly important that the present model includes statistics relating to the cost of chicken feed in that this cost is the dominant expense in the chicken growing and processing system of FIG. 1. In fact, chicken feed costs are approximately 50% of the total expenses encountered in the chicken growing and processing system. Therefore, any change to the chicken growing and processing system which utilizes the chicken feed more efficiently (i.e., increases the valuable of the variable FEED_CONVERSION) could be of substantial benefit to the chicken growing and processing industry. However, many such potential beneficial changes have not been widely incorporated into the chicken growing and processing system since there has been no model as in the present invention to adequately measure the impact of such changes across the entire chicken growing and processing system rather than a single component.

Subsequently, in step 344 of FIG. 3C, statistics related to the average value of the chickens entering the processing plant 36 are determined. That is, the following five statistics are determined: the average value of a chicken carcass minus the breast meat (in the variable, PARTIAL_CARCASS_VALUE); the average value of a chicken breast in dollars per pound (in the variable, BREAST_VALUE), the average value of an entire chicken in dollars per pound (in the variable, CHICKEN_VALUE), the total value of the saleable chicken meat from the present chicken population (in the variable, TOTAL_CHICKEN_VALUE), and the average value per thousand chickens processed at the processing plant 36 (in the variable, CHICKEN_VALUE_PER_1000).

In step 348, statistics are determined related to the value of the chickens condemned at the processing plant 36. The following statistics are computed: (a) the value of the chickens condemned at the processing plant 36 (in the variable, CONDEMNED_VALUE), and (b) the condemned value, in dollars per pound, per thousand chickens started and then processed (i.e., rendered) by the processing plant 36 (in the variable, CONDEMNED_VALUE_PER_1000).

Subsequently, in step 352, statistics related to the cost (or credit) provided by the application of the chicken growing and processing factor determined in step 208 of FIG. 2. The following two statistics are provided by the present model: (a) the total cost (or credit) related to the factor being assayed that is not included in any of the statistics determined above (in the variable, FACTOR_VALUE), and (b) the cost (or credit) of this factor per thousand chickens started and then provided to the processing plant 36 (in the variable, FACTOR_VALUE_PER_THOUSAND). Accordingly, the two statistics determined here may be either positive or negative, depending on whether the factor is a credit or a cost, respectively, when applied to the chicken growing and processing system. Thus, if the factor determined in step 208 of FIG. 2 is to, for example, widen the range of permissible temperatures allowed in one or more of the chicken growing and processing components 20–36, then this factor would most likely provide a credit and therefore the statistics here would be positive.

In step 356, statistics related to the profit of the entire chicken growing and processing system of FIG. 1 are computed. In the present model, the following two statistics are computed. The gross profit provided per thousand chickens processed at the processing plant 36 (in the variable, GROSS_PROFIT_PER_1000) and an adjusted gross profit per thousand chickens processed at the chicken processing plant 36 wherein the gross product is adjusted by the addition of the value of the variable, FACTOR_VALUE_PER_1000.

Lastly, in step 360, the following variables have their values stored for later retrieval and comparison with corresponding stored values from a different activation of FIGS. 3A–3D wherein the primary difference between the activations is the change in the factor affecting one or more of the components 20–36 of the chicken growing and processing system as determined in step 208 of FIG. 2. In particular, the following values are stored for further analysis: in NBR_CHICKENS, MORTALITY, AVG_WT, FEED_CONVERSION, PCT_SALEABLE_MEAT, PCT_BREAST_YLD, FEED_COST_PER_TON, PARTIAL_CARCASS_PRICE_PER_LB, BREAST_PRICE_PER_LB, PCT_CONDEMNED, NBR_BIRDS_PROCESSED, CHICKEN_VALUE, CHICKEN_VALUE_PER_1000, CONDEMNED_VALUE_PER_1000, GROSS_PROFIT_PER_1000, FEED_COST_PER_1000, FACTOR_VALUE_PER_1000, GROSS_PROFIT_PER_1000, FEED_COST_PER_1000, and FACTOR_ADJUSTED_PROFIT.

Figure 4:
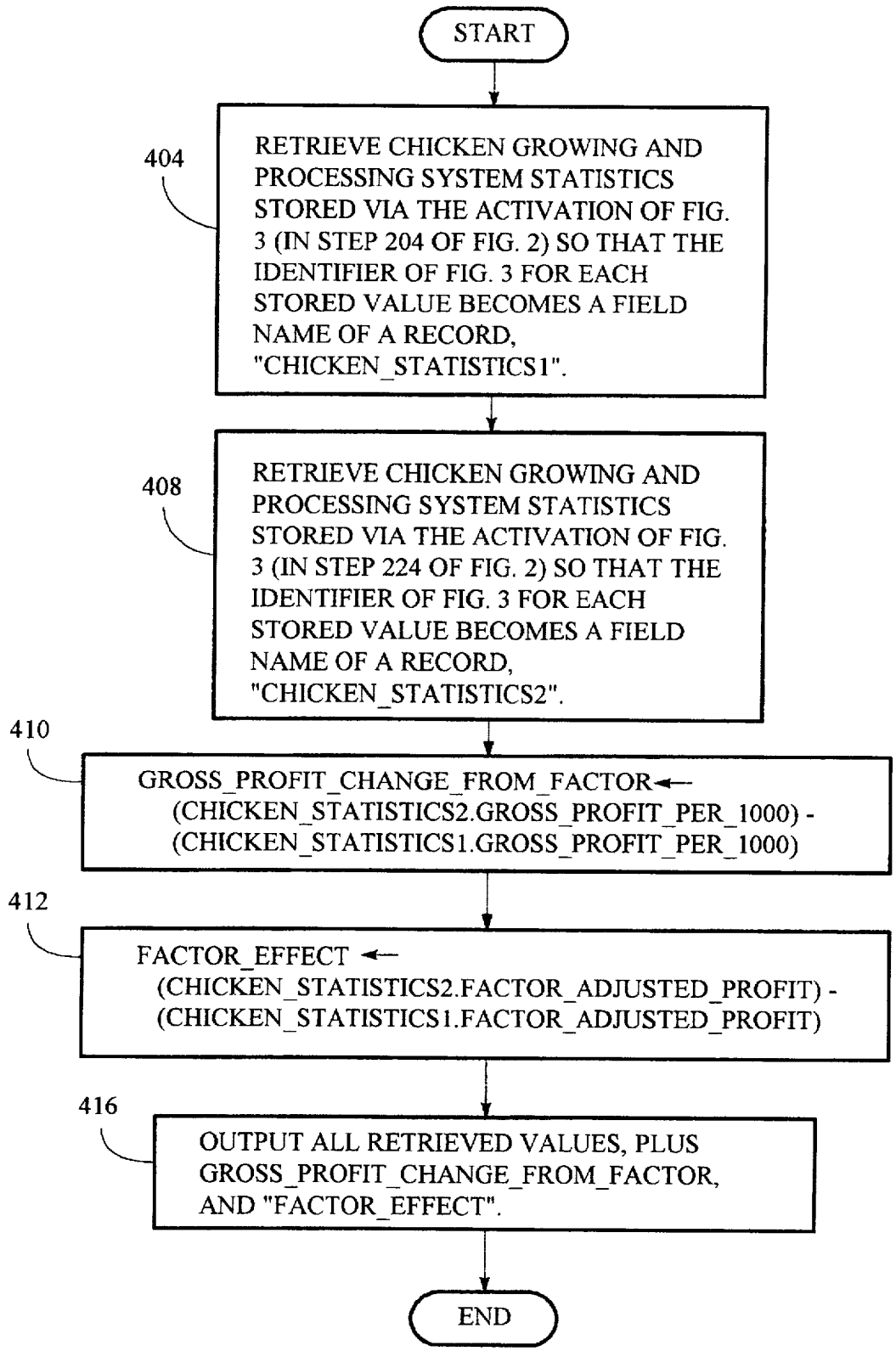
FIG. 4 is a flowchart for comparing the results of two different activations of the model of FIGS. 3A–3D and subsequently printing a report comparing the effect of a chicken growing and processing system factor that changed between the two activations of FIGS. 3 and for determining the effect of this factor on the chicken growing and processing system of FIG. 1 as a whole.

In FIG. 4, a flowchart is presented of the steps performed in producing a report comparing two activations of the flowchart of FIGS. 3A–3D wherein these two activations model chicken growing and processing systems that differ from one another substantially only by the application of the factor determined in step 208 of FIG. 2. Accordingly, in step 404 of FIG. 4, the chicken growing and processing system statistics stored via step 360 from step 204 are retrieved into a record denoted, CHICKEN_STATISTICS1. Subsequently, in step 408, the chicken growing and processing system statistics stored, via step 360 from step 224 of FIG. 2, are retrieved into a record denoted, CHICKEN_STATISTICS2. Following this step, in step 410, a computation is performed for determining the change in gross profit due to the assayed factor whose application to the chicken growing and processing system changed between the chicken growing and processing system measurements used to obtain the values in the record, CHICKEN_STATISTICS1, and those measurements used to obtain the statistics in the record, CHICKEN_STATISTICS2. Similarly, in step 412, a computation is made to determine the net profit effect of the assayed factor. In particular, a determination of the difference in gross profits is made, wherein these gross profits have been adjusted to take into account additional debits and/or credits related to the application (or non-application) of the factor whose effect is being assayed by the present invention. Subsequently, in step 416, the output of all retrieved values above and the newly computed values for GROSS_PROFIT_PER_1000 and FACTOR_EFFECT are output in a report. Examples of this report for assaying various chicken growing and processing factors are provided in FIGS. 5–12. Note that the rightmost column (denoted the "identifier names" column) of each report provides the identifier names used in FIGS. 3 and 4 such that, for each identifier in this column, the values in the row for the identifier are associated with this identifier.

EXAMPLES

Examples of the output of the present invention are illustrated on FIGS. 5A through 12B. These examples illustrate the versatility of the chicken growing and processing assay method and system of the present invention. However, it should be noted that the statistics provided in these figures are, in some cases, approximations since internal computer representations introduce small variations in the values, as one skilled in the data processing art will appreciate. Further note that it is an aspect of the present invention that not all statistics of FIGS. 3 and 4 need be derived in order to provide an indication of the efficacy of the introduced factor. Accordingly, when a statistic is not provided or derived, then any subsequent use of the statistic will have a value zero as the value for the statistic.

FIGS. 5A and 5B illustrate a report output by the present invention that compares the statistics output in step 416 of FIG. 4 for two chicken populations (i.e., population A and population B). In particular, this report shows the effect of adding the feed additive, natamycin, to the chicken feed of population B.

The report of FIGS. 5A and 5B can be further described as follows. The column headed with the term "DESCRIPTION" provides an English description of the values in the rows of the report. The column headed "POPULATION A" includes the values output from the activation of FIGS. 3A–3D at step 204 of FIG. 2 wherein natamycin was not added to the chicken feed for the chicken population corresponding to this column. The values in the column headed "POPULATION B" were obtained from an activation of FIGS. 3A–3D via step 224 of FIG. 2, wherein these values relate to a chicken population having natamycin added to their chicken feed.

In a conventional analysis of the individual chicken growing and processing components 20–36 of FIG. 1, it is believed that adding natamycin to the chicken feed would be viewed as not cost effective since each of the chicken growing and processing components individually relies on one or more of the following rows in the report of FIGS. 5A and 5B: (a) the "feed conversion" row; (b) the additional cost for the natamycin (the row having the description "extra value (cost) for the assayed chicken growing and processing factor"); and (c) the "percent condemned" row. That is, these three rows of the report in FIGS. 5A and 5B indicate that there is: (a) negligible feed conversion increase due to natamycin; (b) there is a substantial extra cost associated with using natamycin in the chicken feed; and (c) a greater percentage of chickens are condemned at the processing plant 36. However, by modeling the chicken growing and processing system according to FIGS. 2–4, it is determined (in the last row of FIG. 5B) that there is a substantial benefit to using natamycin in the chicken feed; i.e., an increase of $8.87 per 1000 chickens processed. It is important to note that in previous conventional analyses of various individual components 20–36 of the chicken growing and processing system of FIG. 1, an increase in the profits of a component by even a few cents is important in that there may be as many as 200,000 processed per day in a chicken growing and processing system such as FIG. 1. Thus, the $8.87 indicated as the net change in gross profit due to the addition of natamycin in the chicken feed as indicated by the assay of the present invention provides a substantial incentive for introducing natamycin into the chicken feed for increasing the profits for the entire chicken growing and processing system.

FIGS. 6A and 6B provide a similar report to that of FIGS. 5A and 5B; however, FIGS. 6A and 6B are the output of an assay by the present invention for the effects of the substance, aflatoxin, a commonly occurring substance in a chicken growing and processing system which is toxic to chickens. In particular, referring to the report of FIGS. 6A and 6B, the column of statistics identified as "POPULATION A" was derived from a chicken population subject to no aflatoxin. Alternatively, the statistics of the column identified as "POPULATION B" were derived from a population of chickens that were subject to an average of 7.0 parts per billion of aflatoxin in their chicken feed. Accordingly, the last row of the report indicates that when the chicken growing and processing system is considered in its entirety, there is potentially a substantial amount of increase in profits for the chicken growing and processing system if aflatoxin is controlled.

Referring now to FIGS. 7A and 7B, statistics from the present invention are provided showing its use in measuring the cost effectiveness of two different kinds of chicken feeding mechanisms. In particular, the statistics for the column identified as "POPULATION A" are for a population of chickens processed by the chicken growing and processing system wherein a chain feeder was used to feed the chickens. Alternatively, the statistics for the column identified by "POPULATION B" are for a population of chickens that were fed using a pan feeder. Accordingly, as can be seen by examining the statistic in the final row of FIG. 7B, using pan feeders can significantly increase the cost effectiveness of the chicken growing and processing system.

Referring now to the reports of FIGS. 8, and FIGS. 9, these reports show the results of using the assay method and system of the present invention for evaluating presumably the same feed product provided by two different manufacturers. In particular, referring to FIGS. 8A and 8B, the statistics in the column headed "POPULATION A" were derived from a population of chickens that were fed a conventional or control chicken feed. Alternatively, the statistics of the column headed "POPULATION B" relates to a population of chickens that were fed a chicken medication formed into "plates" provided by a first manufacturer. Note that the change in gross profit statistic in the last row of FIG. 8B indicates the substantial cost effectiveness for the "plate" chicken medication of this manufacturer. Referring now to FIGS. 9A and 9B, a similar comparison is provided wherein, as in FIGS. 8A and 8B, the first column of statistics for "POPULATION A" is the control statistics duplicated from FIGS. 8A and 8B, whereas the second column of statistics for "POPULATION B" is for a chicken population fed a "plate" formed chicken medication from a different, second manufacturer. Note that there is also an increased cost effectiveness when the "plate" chicken medication of the second manufacturer is fed to the chickens. However, when the entire chicken growing and processing system as a whole is considered, there is a substantial difference in the cost-effectiveness between the "plate" chicken medication of these two manufacturers as shown by the assay method and system of the present invention. That is, when the chicken growing and processing system is viewed as a whole, even though the extra cost for the medication of the first manufacturer is approximately double the extra cost for the medication of the second manufacturer, this extra cost is more than offset by the seven-fold increase in the change in profits from using the "plate" chicken medication of the first manufacturer.

The reports of FIGS. 10 and FIGS. 11 provide a comparison similar to those of FIGS. 8 and FIGS. 9. However, instead of comparing different compositions of chicken medications that were provided in a similar form, (i.e., as "plates") as in FIGS. 8 and 9, in FIGS. 10 and FIGS. 11, substantially the same chicken medication was formed into two different chicken medication products, one being in the form of "needles" and the other being in the form of "plates." In particular, in FIGS. 10A and 10B the column of statistics headed "POPULATION B" provides the statistics for a population of chickens that were raised on chicken medication manufactured as "needles", whereas the column of statistics headed "POPULATION A" was derived from a control chicken population that was not fed the chicken medication. Similarly, in FIGS. 11A and 11B, the statistics of "POPULATION A" (also a control population) are compared with the "POPULATION B" statistics for a population of chickens raised on a chicken medication formed as "plates." Thus, note that in comparing the change in the gross profit statistic in the last row for FIGS. 10 and 11, the chicken medication manufactured as "plates" was demonstrated to be substantially more cost effective than the chicken medication manufactured as "needles." In fact, the chicken medication manufactured as "needles" was not as cost effective as the control chicken population that received none of the medication.

Further note that the present assay system and method could have also been used, for example, to directly compare the cost effectiveness of the "needle" and "plate" chicken medications of FIGS. 10 and FIGS. 11.

In FIGS. 12A and 12B, an assay report from the present invention is illustrated wherein the "POPULATION A" column includes statistics derived from a control chicken population and the "POPULATION B" column includes statistics derived from a population of chickens fed a factor consisting of a special granular mineral compound that was mixed with their feed. Accordingly, although there was additional cost for feed (i.e., FEED_COST_PER_TON), as well as an extra cost for the mineral compound (i.e., FACTOR_VALUE_PER_1000), the change in gross profit due to this mineral compound is substantial; i.e., $77.33. It is noteworthy that this assay indicates that most of change in gross profit was due to an increase in breast meat yield.

Also note that it is within the scope of the present invention to compare statistics relating to the efficacy of different amounts of the same factor as determined in step 208 of FIG. 2. Additionally, as one skilled in the art will appreciate. FIG. 2 may be modified so that comparisons as in step 228 of FIG. 2 may be used to compare the efficacy of changing a plurality of chicken growing and processing factors simultaneously. For example, there may be certain synergistic effects from simultaneously changing factors that appear to be substantially unrelated. For example, it may be that changing the number of hours of daylight provided to a chicken population and changing to pan feeders simultaneously provides a greater cost effectiveness than one might anticipate from examining the output of the present assay method and system for each such factor individually.

Moreover, those skilled in the art of data processing will readily understand that the present invention may be embodied in a software/hardware system that performs the flowcharts of FIGS. 2–4.

The foregoing description of the invention has been presented for purposes of illustration and description. Further, the description is not intended to limit the invention to the form disclosed herein. Consequently, variations and modifications commensurate with the above teachings, and combined with the skill or knowledge in the relevant art are within the scope of the present invention. The preferred embodiment described herein above is further intended to explain the best mode known of practicing the invention and to enable others skilled in the art to utilize the invention in various embodiments and with various modifications required by their particular applications or uses of the invention. It is intended that the appended claims be construed to include alternate embodiments to the extent permitted by the prior art.

What is claimed is:

1. A method for assaying a chicken growing and processing system, comprising:
    determining a first measurement of a characteristic of saleable chicken meat produced by said chicken growing and processing system, wherein said chicken growing and processing system includes at least two of the following components: (a) a breeder farm, (b) a hatchery, (c) a raising facility, (d) a processing plant and (e) a chicken transportation capability;
    establishing a measurement of a factor related to processing chickens;
    providing said factor at said measurement to at least one of (a) through (e) of said chicken growing and processing system;
    determining a second measurement of said characteristic of saleable chicken meat produced by said chicken growing and processing system after said step of providing is performed for a predetermined time period; and
    comparing said first measurement of said characteristic of saleable chicken meat with said second measurement of said characteristic of saleable chicken meat for determining an effectiveness of said factor.

2. A method for assaying a chicken growing and processing system as claimed in claim 1, wherein said characteristic of saleable chicken meat includes one of: a chicken carcass characteristic, a chicken breast characteristic, an amount related to a number of live chickens, an amount related to a chicken mortality rate, and an amount related to a price received for saleable chicken meat.

3. A method for assaying a chicken growing and processing system as claimed in claim 2, wherein said chicken carcass characteristic and said chicken breast characteristic are measured by weighing.

4. A method for assaying a chicken growing and processing system as claimed in claim 1, wherein said factor includes one of: a quality of a substance consumable by chickens, a quantity of a substance consumable by chickens, and a chicken growing and processing environmental characteristic.

5. A method for assaying a chicken growing and processing system as claimed in claim 4, wherein said environmental characteristic includes one of: a temperature, an amount of light, an audible stimulus, a video stimulus and a cage size.

6. A method for assaying a chicken growing and processing system as claimed in claim 1, wherein said factor includes a drug consumable by chickens.

7. A method for assaying a chicken growing and processing system as claimed in claim 1, wherein said factor includes one of a quality and quantity of feed for chickens.

8. A method for assaying a chicken growing and processing system as claimed in claim 1, wherein said step of providing includes determining said components of said chicken growing and processing system which use said factor.

9. A method for assaying a chicken growing and processing system as claimed in claim 1, wherein said predetermined time period is at least seven weeks.

10. A method for processing chicken meat, comprising:
    determining a first measurement of a characteristic of saleable chicken meat produced by a chicken growing and processing system, wherein said chicken growing and processing system includes at least two of the following components: (a) a breeder farm, (b) a hatchery, (c) a raising facility, (d) a processing plant and (e) a chicken transportation capability;
    determining a factor related to processing chickens using said chicken growing and processing system;
    establishing a criterion for measuring said factor, said criterion including at least one of: a quality of said factor, a quantity of said factor, and a price of said factor;
    supplying said factor at a first value one or more selected components of the components (a)–(e) included in said chicken growing and processing system;
    determining a second measurement of said characteristic of saleable chicken meat produced by said chicken growing and processing system after said step of supplying is performed for a predetermined time; and
    comparing said first measurement of said characteristic of saleable chicken meat to said second measurement of said characteristic of saleable chicken meat for determining an effectiveness of said factor.

11. A method for processing chicken meat as claimed in claim 10, wherein said characteristic of saleable chicken meat includes a uniformity of breast size.

12. A method for processing chicken meat as claimed in claim 10, wherein said step of supplying includes providing said factor to each of said selected components of said chicken growing and processing system effectively concurrently.

13. A method for processing chicken meat as claimed in claim 10, wherein said step of supplying includes providing said factor to said each of said one or more selected components of said chicken growing and processing system in a predetermined order of said components.

14. A method for processing chicken meat as claimed in claim 13, wherein said predetermined order of said selected components includes providing said factor to a particular one of said selected components when a predetermined generation of chickens is transferred to said particular one of said selected components.

15. A method for processing chicken meat, comprising:

determining a first measurement of a characteristic of saleable chicken meat produced by a chicken growing and processing system, wherein said chicken growing and processing system includes at least two consecutive components of the following sequence of components: (a) a breeder farm, (b) a hatchery, (c) a raising facility, (d) a processing plant and (e) a chicken transportation capability;

determining a factor related to processing chickens that is used by each of said at least two consecutive components;

establishing a criterion for measuring said factor, said criterion including at least one of: a quality of said factor, a quantity of said factor and a price of said factor;

supplying said factor to each of said at least two consecutive components in a measurement determined using said criterion;

determining a second measurement of said characteristic of saleable chicken meat produced by said chicken growing and processing system after said step of supplying is performed for a predetermined time; and comparing said first measurement of said characteristic of saleable chicken meat to said second measurement of said characteristic of saleable chicken meat.

16. An apparatus for assaying a chicken growing and processing system having at least two of the following components: (a) a breeder farm, (b) a chicken hatchery, (c) a chicken raising facility, (d) a chicken processing plant and (e) a chicken transportation capability, comprising:

means for inputting a first measurement for each parameter of a predetermined set of one or more chicken growing and processing parameters, each said parameter related to a performance of said chicken growing and processing system and said performance measured according to a predetermined criterion related to saleable chicken meat, wherein said first measurements are from a first population of chickens processed by said chicken growing and processing system;

means for inputting a second measurement for each parameter of said predetermined set, wherein said second measurements are from a second population of chickens processed by said chicken growing and processing system;

means for inputting a measurement of a controllable chicken growing and processing factor related to said performance of said chicken growing and processing system in processing said second population of chickens, wherein said controllable chicken growing and processing factor is controlled differently in said first and second chicken populations;

means for determining a first value for said predetermined criterion for said first chicken population using said first measurements;

means for determining a second value of said predetermined criterion for said second chicken population using said second measurements;

means for determining a third value measuring an impact on said performance criterion using said measurement of said controllable chicken growing and processing factor;

means for adjusting said second value by said third value for comparing said first value with said adjusted second value to determine an effectiveness of said controllable chicken growing and processing factor.

17. An apparatus as claimed in claim 16, wherein said predetermined set includes a parameter for some of the following: a number of chickens in a chicken population, an amount of total saleable chicken meat per chicken processed by said chicken growing and processing system, an amount of saleable breast meat per chicken processed by said chicken growing and processing system, a partial carcass price per pound, a breast price per pound, a mortality of chickens occurring prior to being transported to a chicken processing plant, a number of chickens condemned at said processing plant, a number of chickens processed at said processing plant, a number of chickens providing saleable chicken meat, a measurement of the weight of chickens at said processing plant, a carcass weight for chickens at said processing plant, a breast weight for chickens at said processing plant, a partial carcass weight for said chickens at said processing plant, a chicken feed cost, a chicken feed conversion value, an amount of chicken feed provided per chicken, a feed cost per chicken, a feed cost per population of chickens, a partial carcass value, a breast meat value, a chicken value, a value for a population of chickens, a condemned chicken value, a condemned value for a population of chickens and a gross profit.

18. An apparatus as claimed in claim 16, wherein said controllable chicken growing and processing factor includes one or more of the following: a substance consumable by chickens, a quantity of a substance consumable by chickens, a chicken growing and processing environmental characteristic and a genetic breed of chickens.

19. An apparatus as claimed in claim 16, wherein said predetermined criterion related to saleable chicken meat includes determining a profit for said chicken growing and processing system.

20. An apparatus as claimed in claim 16, wherein said means for determining said third value includes determining one of a credit and a debit resulting from controllable chicken growing and processing factor applied to said second population.

* * * * *